US009429912B2

(12) United States Patent
Fleck et al.

(10) Patent No.: US 9,429,912 B2
(45) Date of Patent: Aug. 30, 2016

(54) MIXED REALITY HOLOGRAPHIC OBJECT DEVELOPMENT

(75) Inventors: Rod G. Fleck, Bellevue, WA (US);
Nicholas Kamuda, Seattle, WA (US);
Stephen Latta, Seattle, WA (US); Peter Tobias Kinnebrew, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 56 days.

(21) Appl. No.: 13/588,962

(22) Filed: Aug. 17, 2012

(65) Prior Publication Data

US 2014/0049559 A1    Feb. 20, 2014

(51) Int. Cl.
*G03H 1/22*     (2006.01)
*G06T 19/00*    (2011.01)
(Continued)

(52) U.S. Cl.
CPC ........ *G03H 1/2249* (2013.01); *G02B 27/0103* (2013.01); *G06T 19/006* (2013.01); *G03H 2001/0061* (2013.01); *G03H 2001/2284* (2013.01); *G03H 2226/02* (2013.01); *G03H 2227/02* (2013.01)

(58) Field of Classification Search
CPC ..... G06T 19/00; G06T 19/006; G06T 11/60; G06T 17/00; G06F 3/011; G06F 3/012; H04N 5/272; A63F 13/10; G02B 27/017; G09G 5/14; G09G 2340/10; G09G 2340/125
USPC ........................................................ 345/633
See application file for complete search history.

(56) References Cited

U.S. PATENT DOCUMENTS

| 5,495,576 | A | 2/1996 | Ritchey |
| 6,219,032 | B1* | 4/2001 | Rosenberg et al. ........... 345/157 |
| 7,391,424 | B2* | 6/2008 | Lonsing ....................... 345/633 |

(Continued)

FOREIGN PATENT DOCUMENTS

| CN | 102141877 A | 8/2011 |
| CN | 103076875 A | 5/2013 |
| WO | 2011015843 A2 | 2/2011 |

OTHER PUBLICATIONS

ISA European Patent Office, International Search Report and Written Opinion of PCT/US2013/054995, Oct. 4, 2013, Netherlands, 15 pages.

(Continued)

*Primary Examiner* — Ulka Chauhan
*Assistant Examiner* — Sae Won Yoon
(74) *Attorney, Agent, or Firm* — Dan Choi; Judy Yee; Micky Minhas

(57) ABSTRACT

Systems and related methods for presenting a holographic object that self-adapts to a mixed reality environment are provided. In one example, a holographic object presentation program captures physical environment data from a destination physical environment and creates a model of the environment including physical objects having associated properties. The program identifies a holographic object for display on a display of a display device, the holographic object including one or more rules linking a detected environmental condition and/or properties of the physical objects with a display mode of the holographic object. The program applies the one or more rules to select the display mode for the holographic object based on the detected environmental condition and/or the properties of the physical objects.

16 Claims, 8 Drawing Sheets

(51) Int. Cl.
   *G02B 27/01*   (2006.01)
   *G03H 1/00*   (2006.01)

(56) References Cited

U.S. PATENT DOCUMENTS

| | | | |
|---|---|---|---|
| 7,626,596 B2* | 12/2009 | Kotake et al. | 345/632 |
| 7,764,247 B2* | 7/2010 | Blanco et al. | 345/7 |
| 8,072,470 B2* | 12/2011 | Marks | 345/632 |
| 8,234,579 B2* | 7/2012 | Do | A63F 13/10 705/14.2 |
| 8,350,844 B2* | 1/2013 | Sharp et al. | 345/419 |
| 8,405,680 B1* | 3/2013 | Cardoso Lopes et al. | 345/633 |
| 8,633,946 B2* | 1/2014 | Cohen | 345/632 |
| 2006/0026628 A1 | 2/2006 | Wan et al. | |
| 2007/0038944 A1* | 2/2007 | Carignano et al. | 715/757 |
| 2009/0099824 A1* | 4/2009 | Falash et al. | 703/8 |
| 2009/0128449 A1* | 5/2009 | Brown et al. | 345/8 |
| 2009/0167787 A1* | 7/2009 | Bathiche et al. | 345/633 |
| 2010/0001992 A1* | 1/2010 | Schultz et al. | 345/419 |
| 2010/0026723 A1* | 2/2010 | Nishihara | G06F 3/04886 345/671 |
| 2010/0079831 A1 | 4/2010 | Renaud-Goud | |
| 2010/0253700 A1 | 10/2010 | Bergeron | |
| 2011/0151955 A1* | 6/2011 | Nave | 463/2 |
| 2011/0191707 A1 | 8/2011 | Lee et al. | |
| 2011/0219339 A1* | 9/2011 | Densham | 715/849 |
| 2011/0234631 A1* | 9/2011 | Kim et al. | 345/632 |
| 2011/0250962 A1* | 10/2011 | Feiner et al. | 463/31 |
| 2011/0270522 A1* | 11/2011 | Fink | 701/208 |
| 2011/0288831 A1* | 11/2011 | Tan et al. | 703/2 |
| 2012/0056992 A1* | 3/2012 | Kuroda | 348/46 |
| 2012/0081393 A1* | 4/2012 | Kim | 345/633 |
| 2012/0105473 A1* | 5/2012 | Bar-Zeev et al. | 345/633 |
| 2012/0105703 A1* | 5/2012 | Lee et al. | 348/333.11 |
| 2012/0107790 A1* | 5/2012 | Lee et al. | 434/365 |
| 2012/0113141 A1* | 5/2012 | Zimmerman et al. | 345/633 |
| 2012/0122570 A1* | 5/2012 | Baronoff | 463/31 |
| 2012/0142415 A1* | 6/2012 | Lindsay | 463/33 |
| 2012/0249586 A1* | 10/2012 | Wither et al. | 345/633 |
| 2013/0044128 A1* | 2/2013 | Liu | G09G 5/00 345/633 |
| 2013/0050258 A1* | 2/2013 | Liu et al. | 345/633 |
| 2013/0057581 A1* | 3/2013 | Meier | 345/633 |
| 2013/0069986 A1* | 3/2013 | Fock et al. | 345/633 |
| 2013/0088516 A1* | 4/2013 | Ota et al. | 345/633 |
| 2013/0162677 A1* | 6/2013 | Maaradji | A63F 13/12 345/633 |
| 2013/0215230 A1 | 8/2013 | Miesnieks et al. | |
| 2013/0335301 A1* | 12/2013 | Wong et al. | 345/8 |
| 2014/0321736 A1* | 10/2014 | Onai | G06T 13/80 382/154 |
| 2015/0153572 A1* | 6/2015 | Miao | G02B 27/017 345/8 |

OTHER PUBLICATIONS

Mavridis, et al., "The IbnSina Center: An Augmented Reality Theater with Intelligent Robotic and Virtual Characters", Retrieved at <<http://www.dr-nikolaos-mavridis.com/resources/ROMAN09_0212_FI.pdf>>, Proceedings: 18th IEEE International Symposium on Robot and Human Interactive Communication, Mar. 25, 2009, pp. 681-686.

Bimber, et al., "Alternative Augmented Reality Approaches: Concepts, Techniques, and Applications", Retrieved at <<http://diglib.eg.org/EG/DL/Conf/EG2003/tut/tut3.pdf>>, Proceedings: Eurographics (Tutorial Notes), 2003, pp. 01-61.

Xu, et al., "Computer-Generated Holography for Dynamic Display of 3D Objects with Full Parallax", Retrieved at <<http://www.ijvr.org/issues/issue2-2009/6.pdf>>, Proceedings: International Journal of Virtual Reality, vol. 8, No. 2, Jun. 2009, pp. 33-38.

Ziegler, et al., "A Framework for Holographic Scene Representation and Image Synthesis", Retrieved at <<http://graphics.ethz.ch/~peterkau/download/publication_holoieee07.pdf>>, Proceedings: IEEE Transactions on Visualization and Computer Graphics, Apr. 2007, pp. 403-415.

Grossman, et al., "Multi-Finger Gestural Interaction with 3D Volumetric Displays", Retrieved at <<http://www.dgp.utoronto.ca/papers/tgrossman_UIST2004.pdf>>, Proceedings: 17th Annual ACM Symposium on User Interface Software and Technology, Oct. 27, 2004, pp. 61-70.

"Partial Search Report Received for European Patent Application No. EP13198220.9", Mailed Date: Jul. 4, 2014, 6 Pages.

Ventura, et al., "Real-time Planar World Modeling for Augmented Reality", Published on : 2010, Available at : http://www.cs.ucsb.edu/~holl/pubs/Ventura-2010-ARSuperModels.pdf.

European Patent Office, Extended European Search Report received for European Patent Application No. EP13198220.9, Nov. 19, 2014, 10 Pages.

The State Intellectual Property Office of China, First Office Action and Search Report issued in Patent Application No. 201310757230.8, May 5, 2016, China, 11 pages.

* cited by examiner

MIXED REALITY HOLOGRAPHIC OBJECT DEVELOPMENT

BACKGROUND

Augmented or mixed reality devices may be used in a variety of real-world environments and contexts to provide a view of the real-world that is augmented by holographic objects and other virtual reality information. Depending upon the real-world environment and context in which a mixed reality device is used, a given holographic object or other virtual reality information may or may not be well-suited for the environment and/or context. For example, a mixed reality bowling video game may utilize a life-size holographic bowling lane and pins. Such holographic objects may be well-suited for game playing in a large open space in which the bowling lane fits, but poorly suited for game playing in a more confined space, such as a smaller living room.

It can prove challenging for developers of mixed reality applications and/or holographic objects to accurately predict the real-world environment and context in which an application or object will be used. Accordingly, it can be difficult for such developers to create holographic objects that are well-suited to a variety of end use environments and contexts.

SUMMARY

To address one or more of the above issues, a self-adapting holographic object presentation system for presenting a holographic object that self-adapts to a mixed reality environment and related methods are provided. In one example, a self-adapting holographic presentation system may include a display device and a holographic object presentation program executed by a processor of the display device. The holographic object presentation program may be configured to capture physical environment data from a destination physical environment. The holographic object presentation program may create a model of the destination physical environment based on the captured physical environment data, with the model including identified physical objects having associated physical object properties.

The holographic object presentation program may identify a holographic object for display on a display of the display device, with the holographic object including one or more rules linking a detected environmental condition and/or the physical object properties of the identified physical objects with a display mode of the holographic object. The holographic object presentation program may then apply the one or more rules to select the display mode for the holographic object based on the detected environmental condition and/or the physical object properties of the identified physical objects.

In another example, a method for developing a holographic object that self-adapts to a mixed reality environment may be provided. The method may include determining a physical environment data schema that includes physical object properties and associated value ranges. Each of a plurality of possible destination physical environments may be representable by an instance of the physical environment data schema populated with specific physical data values for each of the physical object properties. The method may also determine a virtual environment data schema that includes virtual environment characteristics and associated value ranges. Each of a plurality of possible virtual environments may be representable by an instance of the virtual environment data schema populated with specific virtual data values for each of the virtual environment characteristics.

The method may display a holographic object creation interface on a display, with the holographic object creation interface configured to display at least one selector for receiving user input corresponding to a display mode of the holographic object that is based upon one or more of the physical object properties of the physical environment data schema and/or one or more of the virtual environment characteristics of the virtual environment data schema. The method may receive via the selector user input corresponding to the display mode, and may generate as output the holographic object including the display mode. The generated holographic object may be configured to be rendered by a holographic object presentation program on a display device according to the display mode, with the destination physical environment viewable through the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
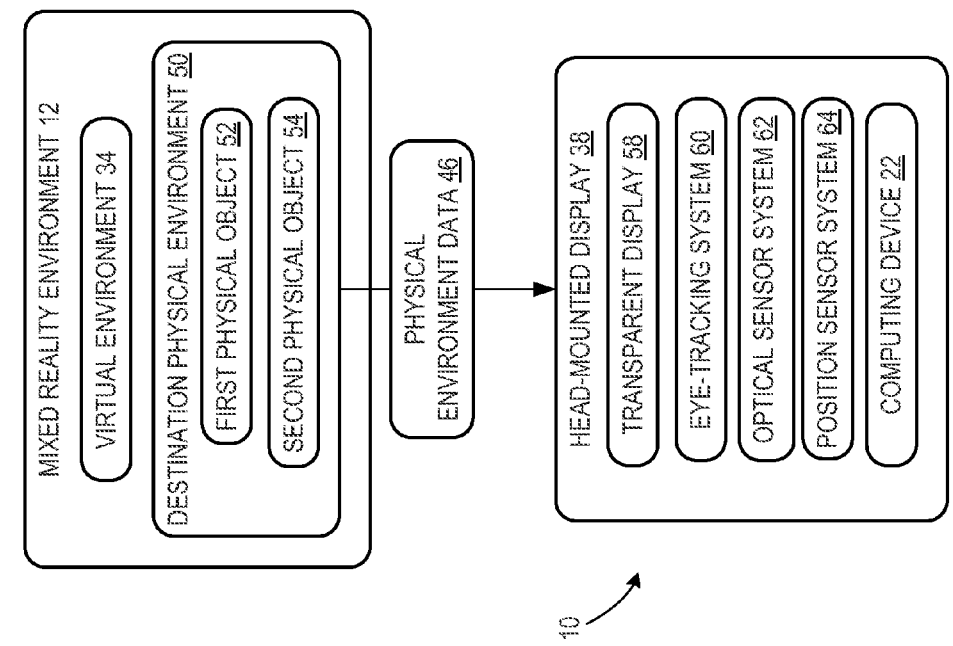
FIG. 1 is a schematic view of a self-adapting holographic object presentation system according to an embodiment of the present disclosure.
Figure 2:
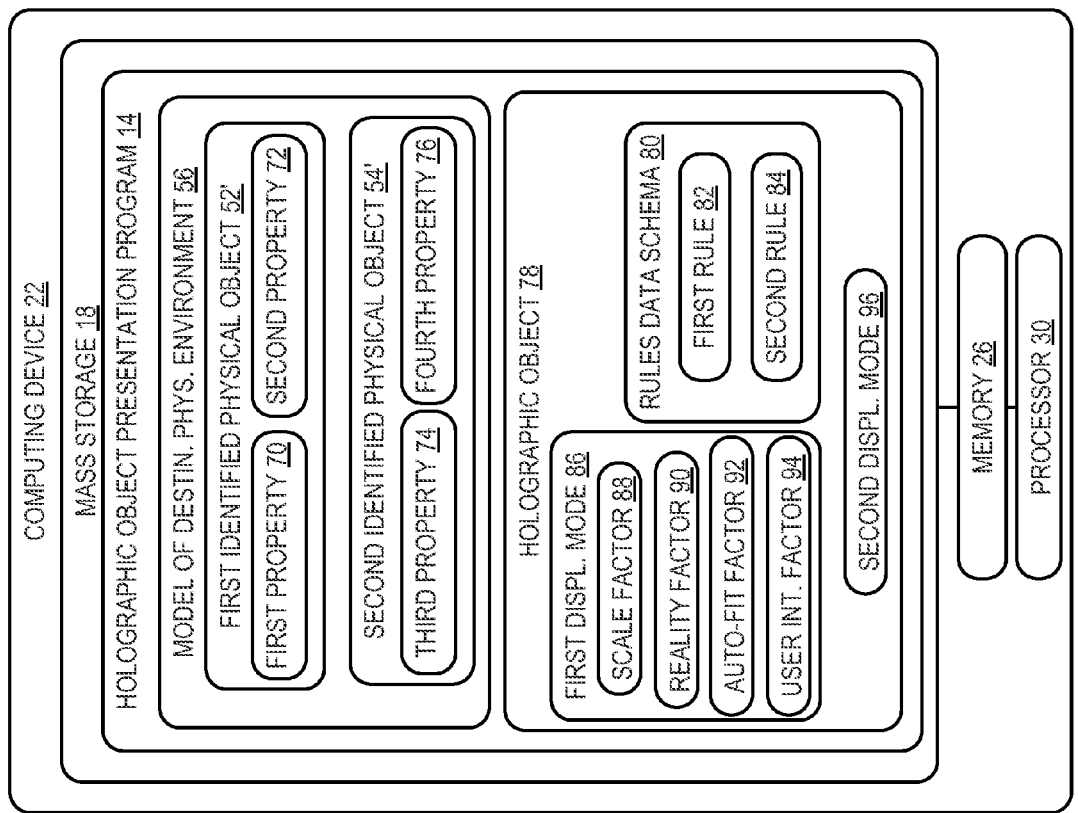
FIG. 2 is a more detailed schematic view of the computing device of FIG. 1.

FIG. 1 shows a schematic view of one embodiment of a self-adapting holographic object presentation system 10 for presenting a holographic object that self-adapts to a mixed reality environment 12. With reference also to FIG. 2, the self-adapting holographic object presentation system 10 includes a holographic object presentation program 14 stored in mass storage 18 of a computing device 22. The holographic object presentation program 14 may be loaded into memory 26 and executed by a processor 30 of the computing device 22 to perform one or more of the methods and processes described in more detail below.

In one example, the holographic object presentation program 14 may generate a virtual environment 34 for display on a display device, such as the head-mounted display (HMD) device 38. It will be appreciated that the holographic object presentation program 14 may utilize other types of display devices including, but not limited to, transparent displays, hand-held displays, displays using a background camera overlay, and any other suitable type of display. As explained in more detail below, the virtual environment 34 may include one or more holographic objects 78 that include one or more display modes. In other examples, the virtual environment 34 may be generated by a separate virtual environment generating program (not shown) that is accessed by the computing device 22 via network 42. It will be appreciated that the virtual environment 34 may provide an augmented reality experience in the form of an interactive video game, motion picture experience, or other suitable electronic game or experience.

The HMD device 38 includes a transparent display 58 through which a user may view a destination physical environment 50. The HMD device 38 may also capture physical environment data 46 from the destination physical environment 50. The destination physical environment 50 may include one or more physical objects, such as a first physical object 52 and a second physical object 54. Using such physical environment data 46, the holographic object presentation program 14 may create a model 56 of the destination physical environment 50. As explained in more detail below, the model 56 may include one or more identified physical objects from the destination physical environment 50, with each of the physical objects having associated physical object properties.

The computing device 22 may be operatively connected with the HMD device 38 using a wired connection, or may employ a wireless connection via WiFi, Bluetooth, or any other suitable wireless communication protocol. Additionally, the example illustrated in FIG. 1 shows the computing device 22 as an integrated component in the HMD device 38. It will be appreciated that in other examples the computing device 22 may be a separate component from the HMD device 38. In these examples the computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 8.

The computing device 22 also may be operatively connected with one or more additional devices via network 42. In one example, the computing device 22 may communicate with a server 40. Network 42 may take the form of a local area network (LAN), wide area network (WAN), wired network, wireless network, personal area network, or a combination thereof, and may include the Internet.

Figure 3:
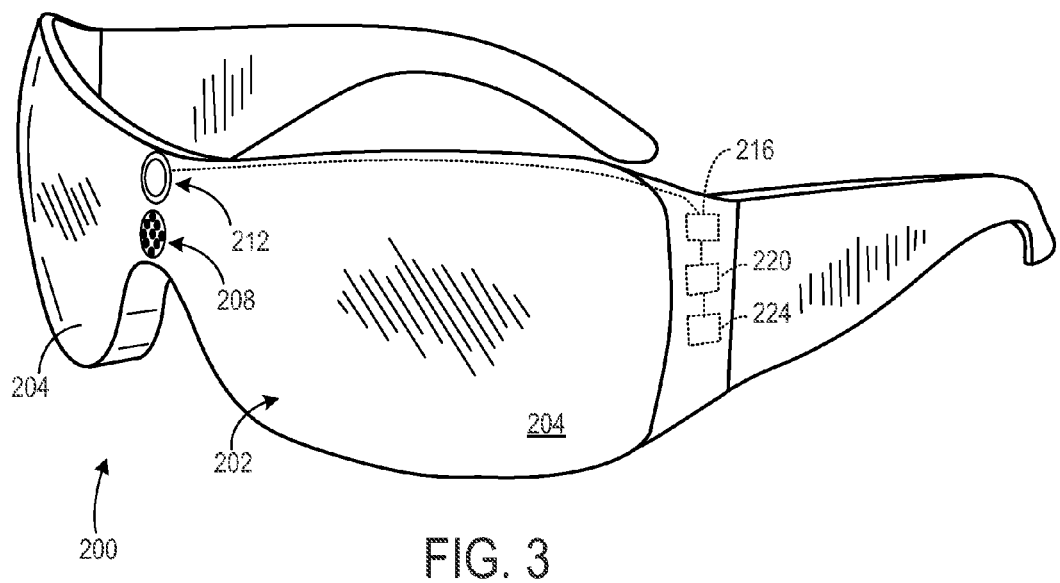
FIG. 3 shows an example head-mounted display device according to an embodiment of the present disclosure.

FIG. 3 shows one example of HMD device 38 in the form of a pair of wearable glasses 200 including a transparent display 202. It will be appreciated that the HMD device 38 shown in FIG. 1 may take the form of the wearable glasses 200, as described in more detail below, or any other suitable HMD device. For example, the HMD device 38 may take other forms in which a transparent, semi-transparent or non-transparent display is supported in front of a viewer's eye or eyes. It will also be appreciated that many other types and configurations of display devices having various form factors may also be used. For example, a hand-held display device that provides an augmented reality experience may also be used.

With reference to FIGS. 1-3, in this example the wearable glasses 200 include a transparent display 202 that enables images to be delivered to the eyes of a user wearing the glasses. The transparent display 202 may be configured to visually augment an appearance of a physical environment, such as destination physical environment 50, to a user viewing the physical environment through the transparent display. For example, the appearance of the physical environment 50 may be augmented by graphical content (e.g., one or more pixels each having a respective color and brightness) that is presented via the transparent display 202.

The transparent display 202 may also be configured to enable a user to view a real-world object in the physical environment 50 through one or more partially transparent pixels that are displaying a virtual object representation. In one example, the transparent display 202 may include image-producing elements located within lenses 204 (such as, for example, a see-through Organic Light-Emitting Diode (OLED) display). As another example, the transparent display 202 may include a light modulator on an edge of the lenses 204. In this example, the lenses 204 may serve as a light guide for delivering light from the light modulator to the eyes of a user.

In other examples, transparent display 202 may support selective filtering of light received from the physical environment 50 before reaching an eye of a user wearing the glasses 200. Such filtering may be performed on a pixel-by-pixel basis or on groups of pixels. In one example, transparent display 202 may include a first display layer that adds light in the form of one or more illuminated pixels, and a second display layer that filters ambient light received from the physical environment. These layers may have different display resolution, pixel density, and/or display capabilities.

The wearable glasses 200 may also include various systems and sensors. For example, and with reference also to the HMD device 38 in FIG. 1, the glasses 200 may include an eye-tracking system 60 that utilizes at least one inward facing sensor 208. The inward facing sensor 208 may be an image sensor that is configured to acquire image data in the form of eye-tracking information from a user's eyes. Provided the user has consented to the acquisition and use of this information, the eye-tracking system 60 may use this information to track the position and/or movement of the user's eyes. The eye-tracking system 60 may then determine where and/or at what real-world or virtual object the user is gazing.

The wearable glasses 200 may also include an optical sensor system 62 that utilizes at least one outward facing sensor 212, such as an optical sensor. Outward facing sensor 212 may detect movements within its field of view, such as gesture-based inputs or other movements performed by a user or by a person within the field of view. Outward facing sensor 212 may also capture image information and depth information from a physical environment and real-world objects within the environment. For example, outward facing sensor 212 may include a depth camera, a visible light camera, an infrared light camera, and/or a position tracking camera. In some examples, outward facing sensor 212 may include one or more optical sensors for observing visible spectrum and/or infrared light from real-world lighting conditions in the physical environment. Such sensors may include, for example, a charge coupled device image sensor.

As noted above, one or more depth cameras may enable the wearable glasses 200 to provide depth sensing. Each depth camera may include left and right cameras of a stereoscopic vision system, for example. Time-resolved images from one or more of these depth cameras may be registered to each other and/or to images from another optical sensor such as a visible spectrum camera, and may be combined to yield depth-resolved video.

In some examples, a depth camera may take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

In other examples, a depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination. The integration times for the two or more depth cameras may differ, such that a pixel-resolved time-of-flight of the pulsed illumination, from the source to the scene and then to the depth cameras, is discernable from the relative amounts of light received in corresponding pixels of the two depth cameras. The wearable glasses 200 may also include an infrared projector to assist in structured light and/or time of flight depth analysis.

It will also be appreciated that depth information may be generated from other information and/or solutions including, but not limited to, motion stereo and ultrasound information.

In other examples, gesture-based and other motion inputs from a user and/or persons in the physical environment may also be detected via one or more depth cameras. For example, outward facing sensor 212 may include two or more optical sensors with known relative positions for creating depth images. Using motion results from these optical sensors with known relative positions, such depth images may evolve over time.

Outward facing sensor 212 may capture images of the physical environment 50 in which a user is situated. As discussed in more detail below, such images may be part of physical environment data 46 that may be received by the glasses 200. As noted above, the holographic object presentation program 14 may include a 3D modeling system that uses such physical environment data 46 to generate a model 56 of the destination physical environment 50.

The wearable glasses 200 may also include a position sensor system 64 that utilizes one or more motion sensors 216 to enable position tracking and/or orientation sensing of the glasses, and determine a position of the glasses within a physical environment. As one example, position sensor system 64 may comprise an inertial measurement unit configured as a six-axis or six-degree of freedom position sensor system. Such a position sensor system may include, for example, three accelerometers and three gyroscopes to indicate or measure a change in location of the glasses 200 within three-dimensional space along three orthogonal axes (e.g., x, y, z), and a change in an orientation of the glasses about the three orthogonal axes (e.g., roll, pitch, yaw).

Position sensor system 64 may support other suitable positioning techniques, such as GPS or other global navigation systems. For example, position sensor system 64 may include a wireless receiver (e.g., a GPS receiver or cellular receiver) to receive wireless signals broadcast from satellites and/or terrestrial base stations. These wireless signals may be used to identify a geographic location of the glasses 200.

Positioning information obtained from wireless signals received by the glasses 200 may be combined with positioning information obtained from the motion sensors 216 to provide an indication of location and/or orientation of the glasses 200. While specific examples of position sensor systems have been described, it will be appreciated that other suitable position sensor systems may be used. Other examples of motion sensors 216 include an accelerometer, a gyroscope, a compass, and an orientation sensor, which may be included as any combination or subcombination thereof. Position information may also be used with data from outward facing sensor 212 to help generate 3D surface reconstruction information.

The glasses 200 may also include one or more microphones 220. In some examples, and as described in more detail below, microphones 220 may receive audio input from a user and/or audio input from a physical environment around the user. Additionally or alternatively, one or more microphones separate from the glasses 200 may be used to receive audio input. In some examples audio input, such as voice input from a user, may be used with a natural user interface to control one or more features of the self-adapting holographic object presentation system 10 as described below. The glasses 200 may also include audio output components, such as speakers or ear pieces, to allow sounds from holographic objects to be delivered to the user. Such sounds may also be processed using digital signal processing to create a user perception of the sounds coming from specific holographic objects and/or 3D locations within the scene.

As noted above, the glasses 200 may also include a computing device 22 having a logic subsystem and a data-holding subsystem, as discussed in more detail below with respect to FIG. 8, that are in communication with the various input and output devices of the glasses. Briefly, the data-holding subsystem may include instructions that are executable by the logic subsystem, for example, to receive and process inputs from the sensors, and to present images to a user via the transparent display 202.

It will be appreciated that the wearable glasses 200 and related sensors and other components described above and illustrated in FIGS. 1-3 are provided by way of example. These examples are not intended to be limiting in any manner, as any other suitable sensors, components, and/or combination of sensors and components may be utilized. Therefore it is to be understood that the wearable glasses 200 may include additional and/or alternative sensors, cameras, microphones, input devices, output devices, etc. without departing from the scope of this disclosure. Further, the physical configuration of the wearable glasses 200 and its various sensors and subcomponents may take a variety of different forms without departing from the scope of this disclosure.

Figure 4:
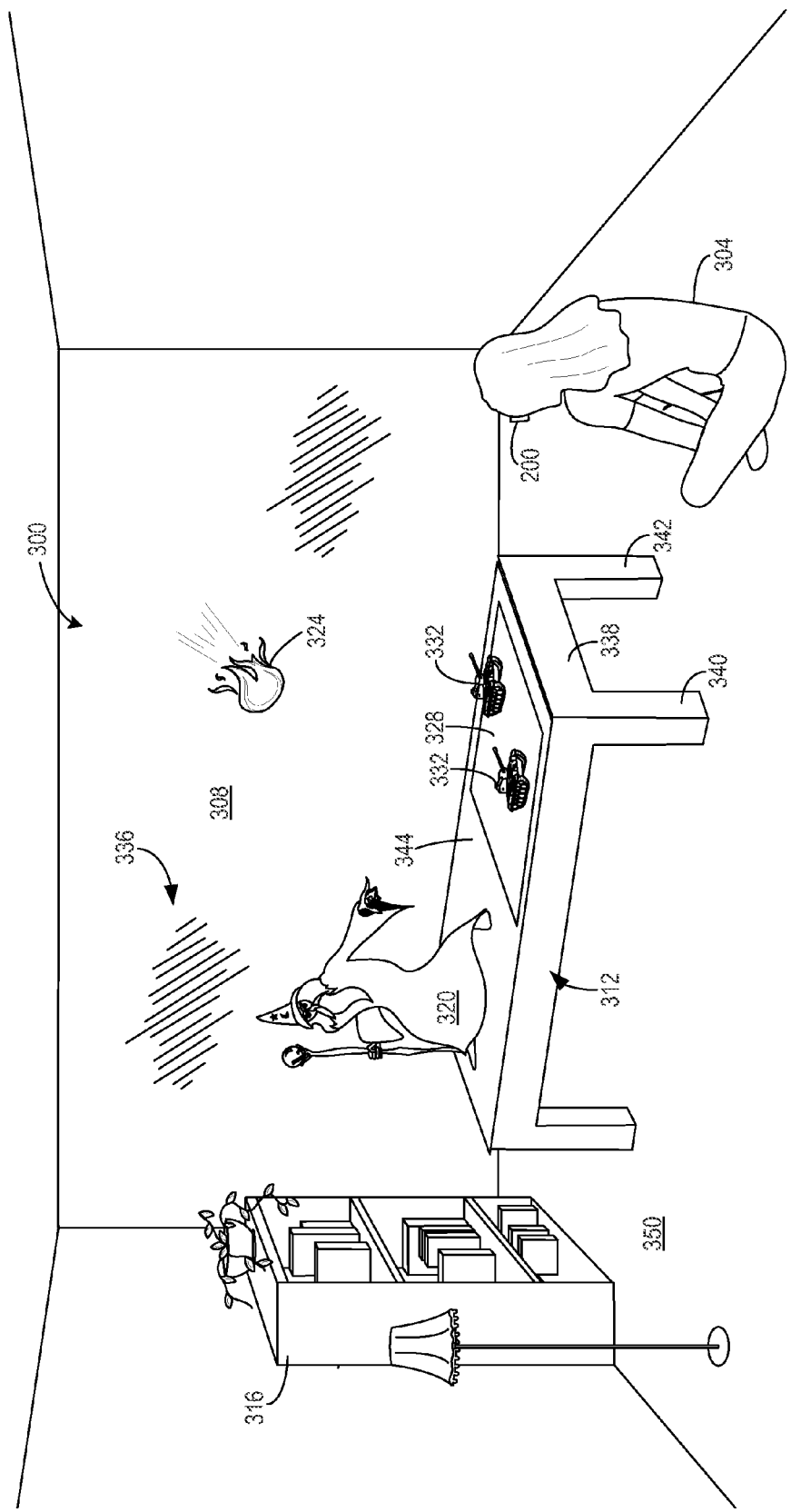
FIG. 4 a schematic view of a physical environment that shows holographic objects generated by the self-adapting holographic object presentation system of FIG. 1 and a user wearing a head-mounted display device.

With reference now also to FIG. 4, descriptions of example embodiments and use cases utilizing the self-adapting holographic object presentation system 10 will now be provided. FIG. 4 provides a schematic view of a destination physical environment 50 in the form of a room 300 in which a user 304 wearing the wearable glasses 200 is located. The room 300 includes real-world physical objects such as a wall 308, table 312 and bookcase 316. In this example, the user 304 may be viewing a 3-D movie experience via the wearable glasses 200.

With reference also to FIG. 2, FIG. 4 illustrates holographic objects 78 in the form of a holographic wizard 320, holographic flaming asteroid 324, holographic game board 328, and holographic tanks 332 that are perceived by the user 304 as being located in the room 300. The holographic objects 78 are presented to the user 304 by being displayed on the transparent display 202 of the wearable glasses 200 worn by the user. It will be appreciated that the presentation of the holographic objects 78 may also be coordinated with the model 56 of the room 300 that is generated by the holographic object presentation program 14.

The model 56 of the room 300 may be based on the physical environment data 46 captured by one or more sensors of the wearable glasses 200. With reference to FIGS. 1 and 2, the model 56 may include a first identified physical object 52' that corresponds to the first physical object 52, and a second identified physical object 54' that corresponds to the second physical object 54. The first identified physical object 52' may have associated physical object properties such as first property 70 and second property 72. Similarly, the second identified physical object 54' may have associated physical object properties such as third property 74 and fourth property 76.

In some examples, the room 300 may also have one or more tags associated with a virtual object and its location in the room. The glasses 200 may identify the one or more tags presently or previously in time. Examples of a tag may include an element that resembles a playing card, a specific poster, and/or a label on an object. Dynamic tags may also be used to denote a relationship, for example between a specific piece of clothing and a handheld object, such as the handle of a sword or a light saber. Such tags may then be used as 3D coordinates for holographic objects to be overlaid within the room 300.

The holographic object presentation program 14 may create the model 56 of the room 300 based on the physical environment data 46 captured by the wearable glasses 200. Such physical environment data 46 may include, for example, data related to the wall 308, table 312 and bookcase 316. In one example of creating the model 56, the holographic object presentation program 14 may utilize a surface reconstruction phase to identify and reconstruct a wall surface 336 and multiple surfaces of the table 312, such as user facing surfaces 338, 340, and 342, and top surface 344. In an object identification phase, the holographic object presentation program 14 may then group the identified surfaces into identified physical objects. In this manner, the wall surface 336 may be identified as wall 308, and the facing surfaces 338, 340, and 342, and top surface 344 may be grouped into the table 312.

The wall 308 and table 312 may have physical object properties that are either prestored for each object or are identified through the captured physical environment data 46. For example, an optical sensor in the outward facing sensor 212 of the wearable glasses 200 may identify the wall surface 336 as a planar surface extending horizontally for 4.5 meters and vertically for 2.5 meters. Based on this and perhaps other physical environment data 46, the surface 336 may be identified as a wall 308.

In one example, the wall 308 may have associated physical object properties that are prestored in mass storage 18. For example, the wall 308 may have a prestored surface hardness property that corresponds to a particular hardness of the wall surface. The surface hardness property may identify the wall 308 as having a hardness within a range of hardness values that correspond to various materials and/or construction techniques for walls or similar partitions. In one example, the hardness values may include values corresponding to materials such as concrete, wood, dry wall material, rubber, and fabric/curtain material. Accordingly, when a holographic object 78 interacts with the wall 308, the hardness value of the surface hardness property of the wall may affect the corresponding behavior of the holographic object.

In another example, the wall 308 may have an associated physical object property that is identified through the captured physical environment data 46. For example, the optical sensor in the outward facing sensor 212 of the wearable glasses 200 may identify the wall surface 336 as being white in color. In one example, the white color of the wall surface 336 may be used to determine or adjust the color of a holographic object that is displayed in front of the wall 308.

In another example, the table 312 may have an orientation property that is identified through image data captured by the wearable glasses 200. The orientation property may include, for example, an angle of the top surface 344 of the table 312 with respect to the floor 350 of the room 300. Such angle may be used to affect the corresponding behavior of a holographic object 78 that interacts with the table. For example, where the top surface 344 is determined to be oriented at an angle with respect to the floor 350, a holographic ball placed on the top surface may roll off the table 312.

The holographic object presentation program 14 may identify one or more holographic objects 78 for display on the wearable glasses 200. For example, the holographic wizard 320, holographic asteroid 324, holographic game board 328, and holographic tanks 332 may be identified. Each of the holographic objects 78 may also include one or more rules contained in a rules data schema 80. In one example, the rules data schema 80 may include a first rule 82 and a second rule 84. The one or more rules may link the physical object properties of the identified physical objects and/or a detected environmental condition with a display mode of the holographic object 78. In some examples, the one or more rules may also adapt over time to accommodate, for example, changes to the physical object properties, changes to a detected environmental condition, and/or other changes in the mixed reality environment 12. Also and as explained in more detail below, the display mode of the holographic object 78 may include one or more factors that affect the rendering and/or presentation of the holographic object.

In one example, a first display mode 86 of the holographic object 78 may include a scale factor 88 that indicates a scale at which the holographic object will be rendered relative to the destination physical environment 50. With reference also to FIG. 4, where the holographic object 78 is the holographic wizard 320, the first rule 82 may link a geometric property of the room 300 to the first display mode 86 of the wizard 320. The geometric property may include, for example, the height of wall 308. The scale factor 88 of the first display mode 86 may indicate a scale at which the wizard 320 will be rendered relative to the wall 308. For example, the scale factor 88 may provide that the wizard 320 will be rendered at a height that is ⅓ the height of the wall 308.

In another example, the first display mode 86 of the holographic object 78 may include a reality factor 90 that indicates a level of realism at which the holographic object will be displayed. In one example where the holographic object 78 is the flaming asteroid 324, the first rule 82 may link an amount of real-world movement in the room 300 to the first display mode 86 of the asteroid. With reference to FIG. 4, in this example the user 304 is sitting passively in an indoor room in which no other real-world movement or activity is occurring. In this case, the first rule 82 may adjust the reality factor 90 of the flaming asteroid 324 to a high level such that the asteroid appears and behaves in a highly realistic manner.

In another example where the user 304 is walking along a crowded city sidewalk among many other pedestrians, the first rule 82 may adjust the reality factor 90 of the flaming asteroid 324 to a low level such that the asteroid is clearly unrealistic. For example, the asteroid may be rendered with a high degree of transparency. In this manner, the user 304 is unlikely to mistake the holographic asteroid 324 for a real asteroid, and may devote her attention to the current activity along the sidewalk.

It will be appreciated that varying levels of realism of a holographic object may be depicted in a variety of manners. For example, the transparency or opacity of the object may be adjusted to increase or decrease its realism. The interaction of the holographic object with its surroundings, such as the object's adherence to the laws of physics, for example, may also be adjusted. For example, a floating baseball will appear less realistic than a baseball that falls in a natural manner toward the ground. Similarly, a baseball that disappears in a puff of smoke when touched will appear less realistic than a baseball that rolls when touched.

In another example, the first display mode 86 of the holographic object 78 may include an auto-fit factor 92 that indicates that the holographic object will be automatically sized to fit into the destination physical environment 50. In one example where the holographic object 78 is the game board 328, the first rule 82 may link a surface area of the top surface 344 of the table 312 to the first display mode 86 of the game board 328. The auto-fit factor 92 of the first display mode 86 may automatically size the game board 328 to fit on the top surface 344 of the table 312. In another example, where a user is sitting in an airline seat with a small seat tray located above the user's lap, the auto-fit factor 92 may automatically size the game board 328 to fit on the top surface of the seat tray. Similarly, the tanks 332 may be sized to fit on the game board 328.

In another example, the first display mode 86 of the holographic object 78 may include a user interaction factor 94 that indicates a user interaction mode for the holographic object. In one example where the holographic object 78 is one of the tanks 332, the first rule 82 may link a display resolution of the tank to the first display mode 86 of the tank. Where the display resolution of the tank is above a threshold resolution, the user interaction factor 94 may correspond to a user interaction mode that allows the user 304 to pick up and move the tank 32 to a different position. In another example where the display resolution is below the threshold resolution, the limited resolution may make such direct interaction between the user 304 and the tank 332 infeasible or impractical. Accordingly, in this case the user interaction factor 94 may correspond to a user interaction mode that enables the user 304 to indirectly interact with the tank 332. In one example, the user 304 may move her hand over a tank 332 and tap downwardly to select the tank. The user 304 may then move her hand to move the tank 332 in a corresponding manner.

As noted above, in other examples the one or more rules in the rules data schema 80 may link a detected environmental condition with a display mode of the holographic object. In one example, the detected environmental condition may include a temperature of the destination physical environment 50. Where the holographic object 78 is the wizard 320, the second rule 84 of the rules data schema 80 may link the temperature to a second display mode 96 of the wizard 320. For example, the second display mode 96 may include a breath factor that indicates whether the wizard's exhales will be visible based on the detected temperature. Where the user 304 is located outdoors and the temperature is 0 degrees C., the breath factor may determine that the wizard's exhales will be visible as steam. In another example where the detected temperature is 25 degrees C., the breath factor may determine that the wizard's exhales will not be visible. It will be appreciated that many other examples of environmental conditions, related rules, display modes and factors may be provided.

In other examples, a display mode may include presenting non-visual information related to a holographic object 78. Such non-visual information may include, for example, audio information associated with the holographic object 78, whether the holographic object 78 is currently in view of the user or not.

In other examples, a holographic object 78 may be adapted to accommodate movement of a physical object in a destination physical environment 50. With reference to FIG. 4, in one example a large dog may enter the room 300 and walk between the user 304 and the user facing surface 338 of the table 312. As the dog moves in front of the table 312 and between the user 304 and the user-perceived location of the holographic wizard 320, gameboard 328 and tanks 332, the holographic object presentation program 56 may adapt these holograms by blocking all or a portion of each hologram from the user's view. Such blocking may be applied according to the position of the dog relative to the user-perceived location of the holograms.

In another example, a holographic flag may be presented on top of a physical remote control car that is being driven in a driveway by a user. As the car accelerates, turns and moves through the scene, the holographic object presentation program 56 may continually adapt the holographic flag to appear in a fixed position atop the moving car, and may present the flag as waving, flapping and/or changing shape in harmony with the movement of the physical car.

Figure 5A:
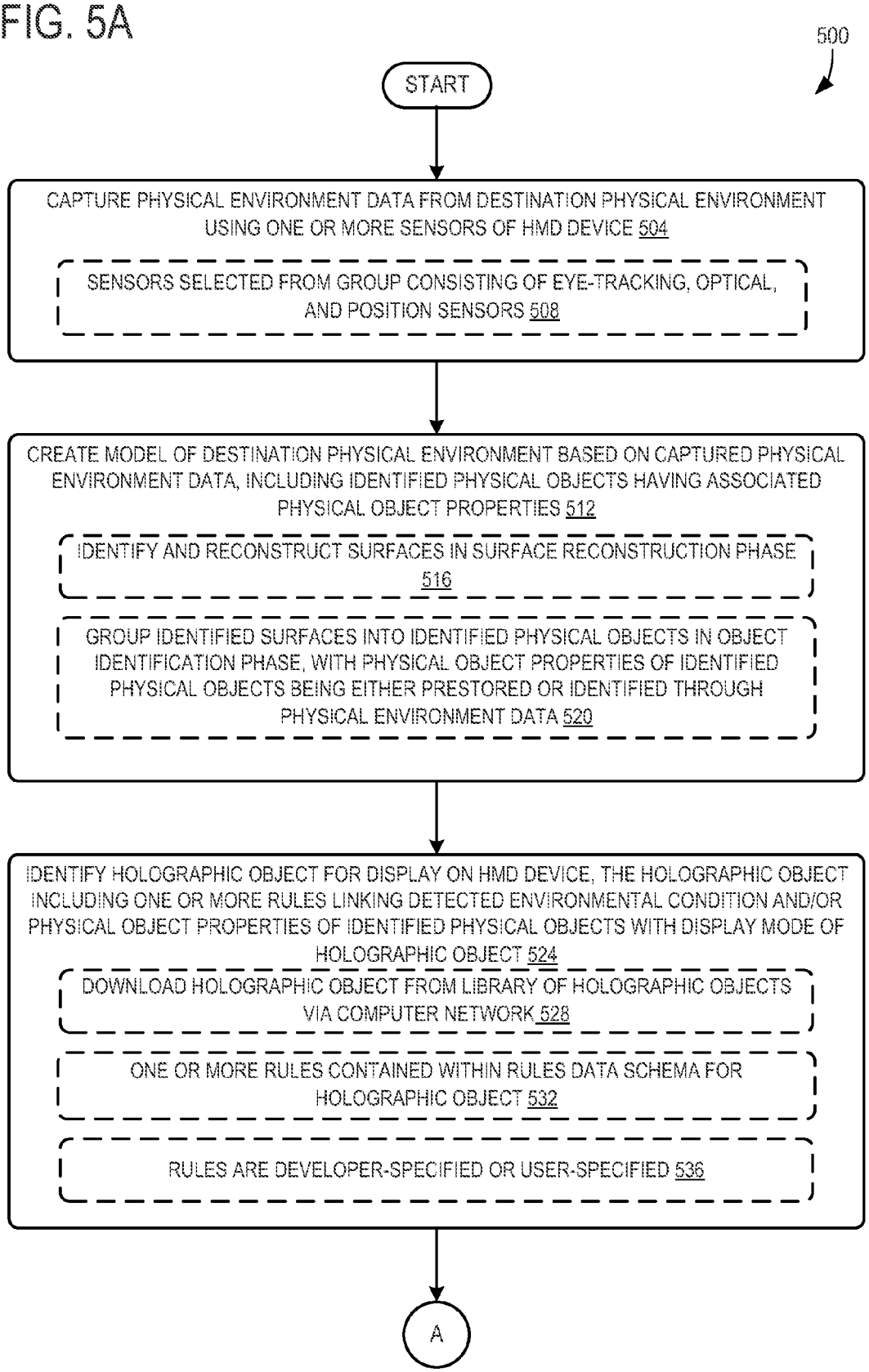
FIGS. 5A and 5B are a flow chart of a method for presenting a holographic object that self-adapts to a mixed reality environment according to an embodiment of the present disclosure.
Figure 5B:
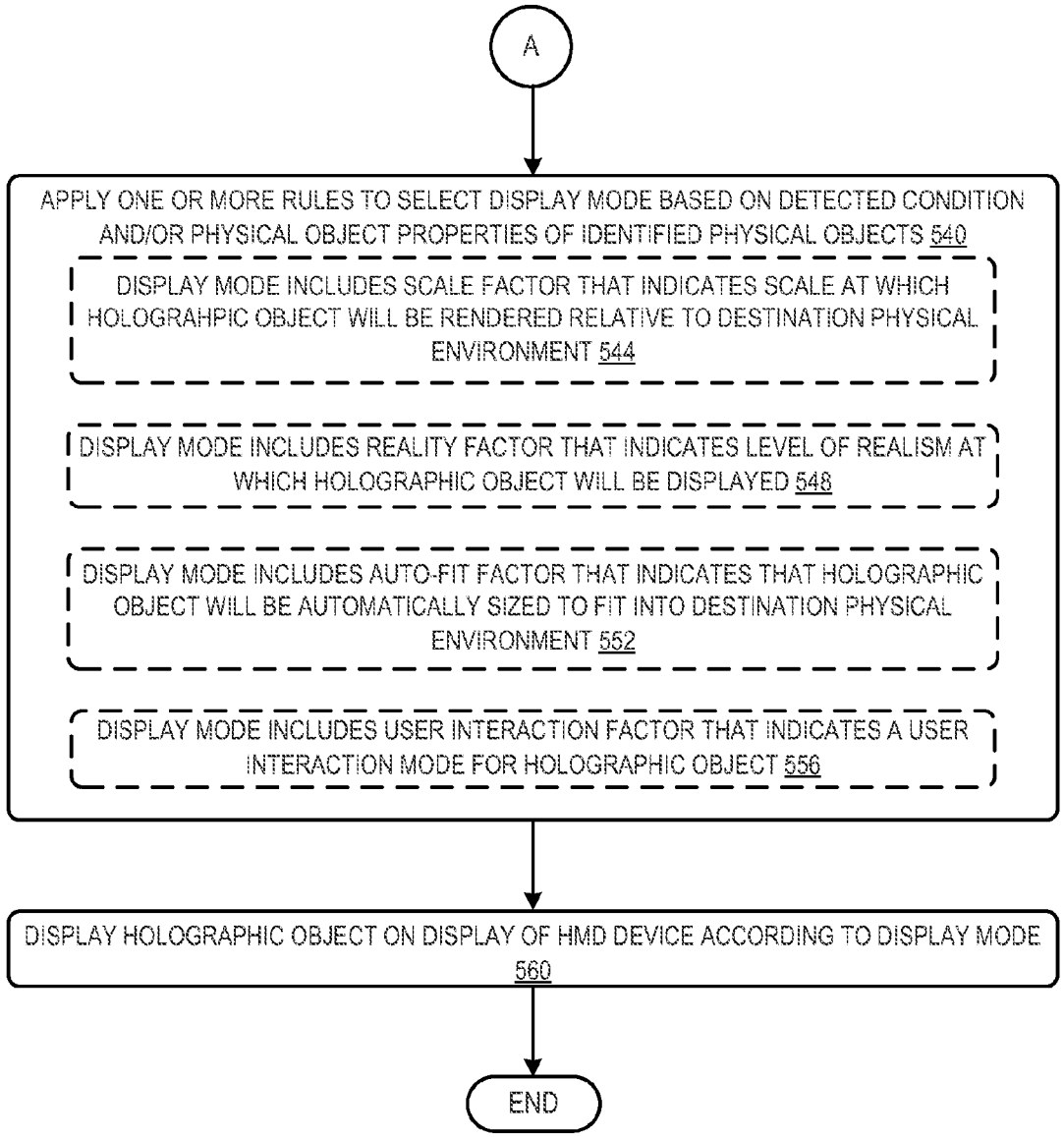

FIGS. 5A and 5B illustrate a flow chart of a method 500 for presenting a holographic object that self-adapts to a mixed reality environment according to an embodiment of the present disclosure. The following description of method 500 is provided with reference to the software and hardware components of the self-adapting holographic object presentation system 10 described above and shown in FIGS. 1 and 2. It will be appreciated that method 500 may also be performed in other contexts using other suitable hardware and software components.

With reference to FIG. 5A, at 504 the method 500 may include capturing physical environment data 46 from the destination physical environment 50 using one or more sensors of the HMD device 38. In one example, at 508 the sensors may be selected from the group consisting of eye-tracking sensors, optical sensors, and positions sensors.

At 512 the method 500 may include creating a model 56 of the destination physical environment based on the captured physical environment data 46, where the model includes identified physical objects in the destination physical environment having associated physical object properties. In one example at 516, creating the model 56 may include identifying and reconstructing surfaces in a surface reconstruction phase. At 520, creating the model 56 may include grouping the identified surfaces into the identified physical objects in an object identification phase, with the physical object properties of the identified physical objects being either prestored or identified through the physical environment data.

At 524 the method 500 may include identifying a holographic object 78 for display on a display 58 of the HMD device 38, where the holographic object includes one or more rules linking a detected environmental condition and/or physical object properties of the identified physical objects with a display mode of the holographic object. In one example, at 528 the method 500 may include downloading the holographic object 78 from a library 79 of holographic objects via a computer network 42. At 532, the one or more rules may be contained within a rules data schema 80 for the holographic object 78. At 536, the one or more rules may be developer-specified or user-specified.

With reference now to FIG. 5B, at 540 the method 500 may include applying the one or more rules to select a display mode for the holographic object 78 based on the detected environmental condition and/or the physical object properties of the identified physical objects in the destination physical environment 50. At 544, the display mode of the holographic object 78 may include a scale factor 88 that indicates a scale at which the holographic object will be rendered relative to the destination physical environment 50. At 548, the display mode of the holographic object 78 may include a reality factor that indicates a level of realism at which the holographic object 78 will be displayed.

At 552, the display mode of the holographic object 78 may include an auto-fit factor that indicates that the holographic object will be automatically sized to fit into the destination physical environment. At 556, the display mode of the holographic object 78 may include a user interaction factor that indicates a user interaction mode for the holographic object. At 560, the method 500 may include displaying the holographic object 78 on the display 58 of the HMD device 38 according to the display mode. In some examples, the holographic object 78 may also interact with the physical environment 50 and/or virtual environment 34 in a manner that results in changes to the holographic object over time. For example, a holographic tank 332 may fall off the table 312 and sustain damage from contacting the floor 350. After such a fall, temporal information reflecting the damage to the holographic tank 332 may remain with the holographic object 78 of the tank.

Figure 6:
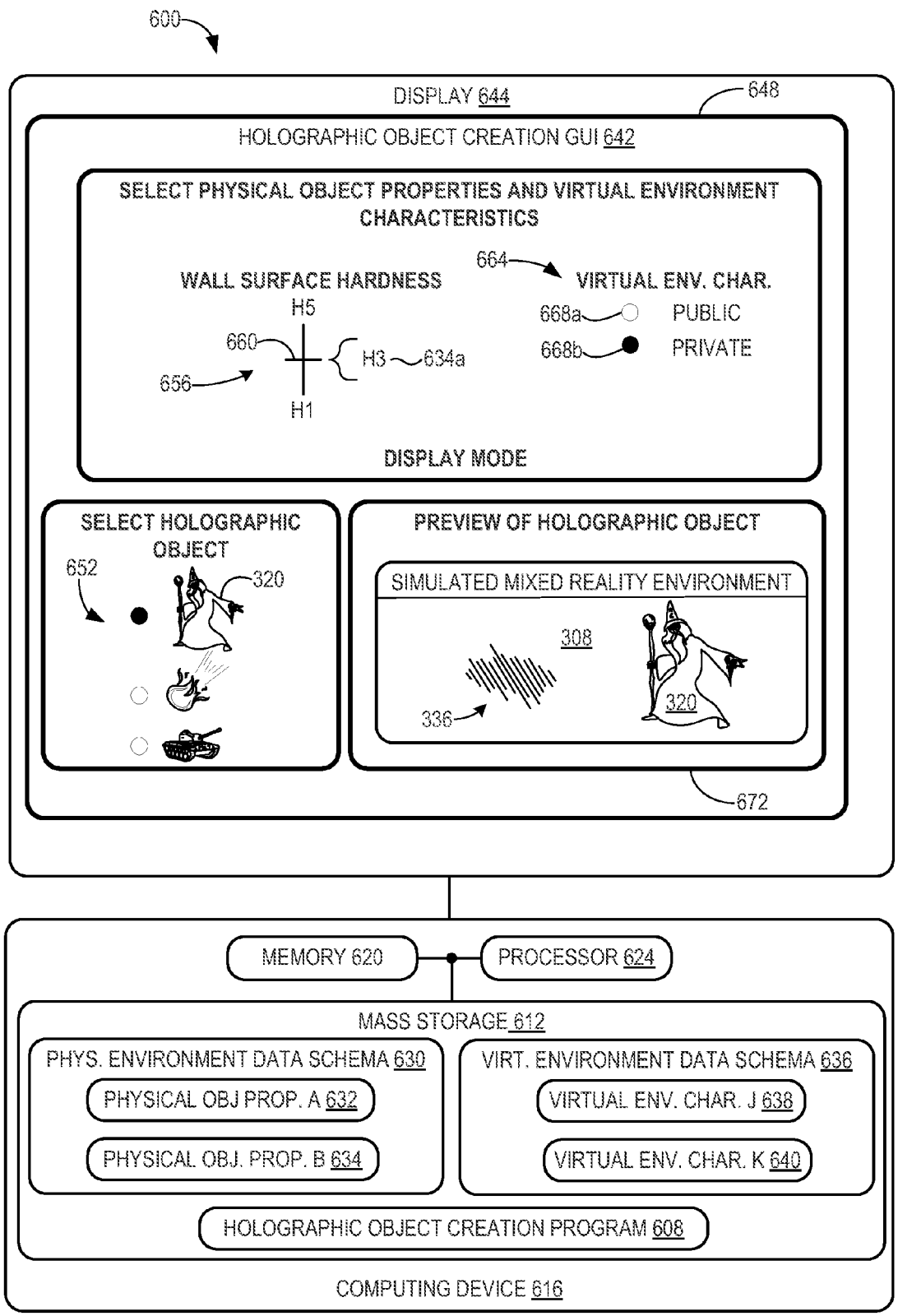
FIG. 6 is a schematic view of a self-adapting holographic object development system according to another embodiment of the present disclosure.
Figure 7:
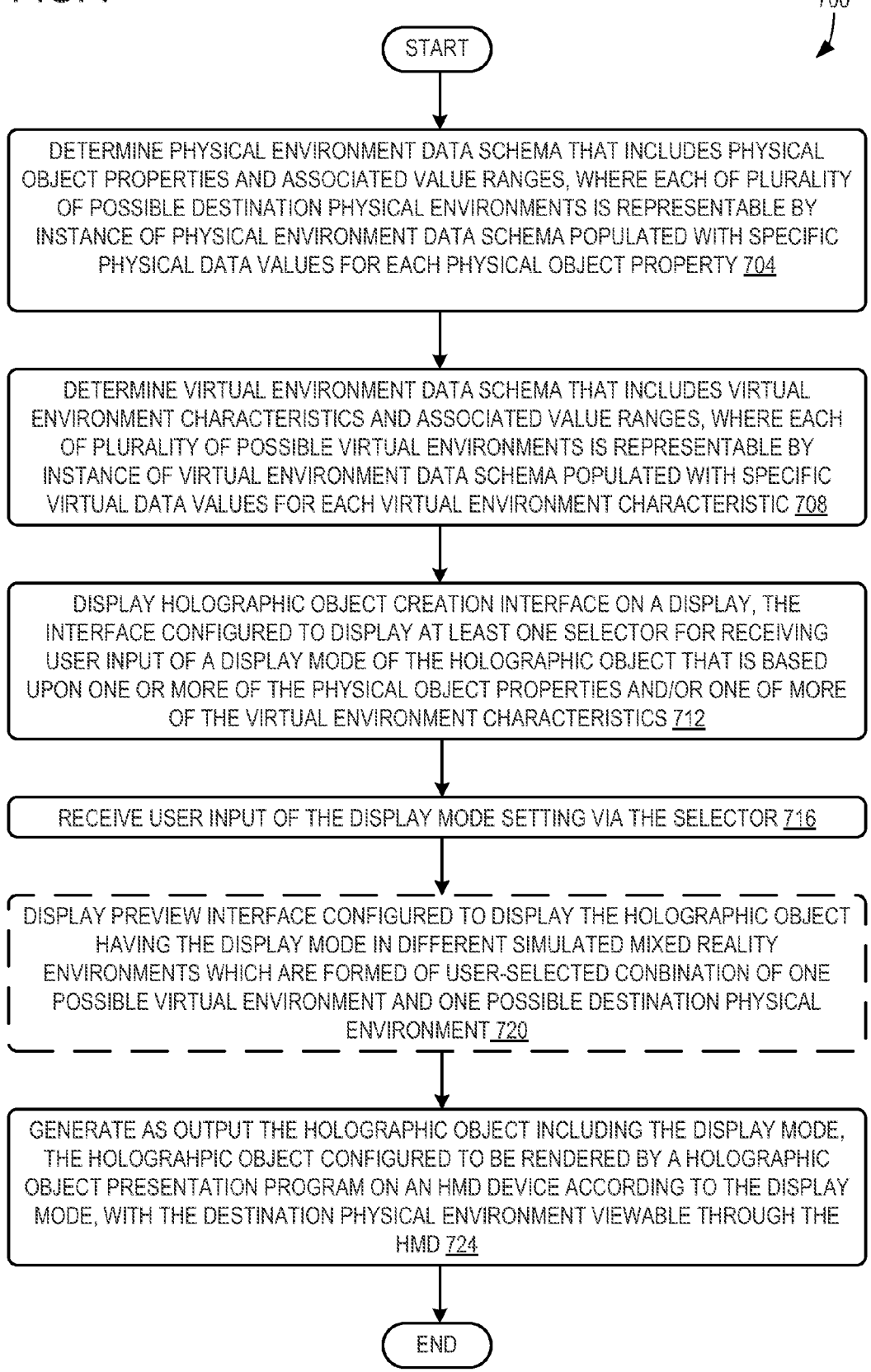
FIG. 7 is a flow chart of a method for developing a holographic object that self-adapts to a mixed reality environment according to an embodiment of the present disclosure.

In another example, and with reference now to FIGS. 6 and 7, a self-adapting holographic object development system 600 for developing a holographic object that self-adapts to a mixed reality environment may be provided. As explained in more detail below, in one example a developer of holographic objects may use the self-adapting holographic object development system 600 to develop and preview holographic objects in different simulated mixed reality environments.

The self-adapting holographic object development system 600 includes a holographic object creation program 608 stored in mass storage 612 of a computing device 616. The holographic object creation program 608 may be loaded into memory 620 and executed by a processor 624 of the computing device 616 to perform one or more of the methods and processes described in more detail below.

A physical environment data schema 630 may be determined and stored in mass storage 612. The physical environment data schema 630 may include one or more physical object properties and associated value ranges that correspond to physical objects in a destination physical environment. In the example shown in FIG. 6, the physical environment data schema 630 includes a physical object property A 632 and a physical object property B 634. By populating an instance of the physical environment data schema 630 with specific physical data values for each of the physical object properties, a possible destination physical environment may be represented. It will be appreciated that a plurality of possible destination physical environments are representable by populating instances of the physical environment data schema with various specific physical data values for each of the physical object properties. It will also be appreciated that different possible destination physical environments may correspond to different display modes of a holographic object.

A virtual environment data schema 636 may also be determined and stored in mass storage 612. The virtual environment data schema 636 may include one or more virtual environment characteristics and associated value ranges that are associated with possible virtual environments. In the example shown in FIG. 6, the virtual environment data schema 630 includes a virtual environment characteristic J 638 and a virtual environment characteristic K 640. By populating an instance of the virtual environment data schema 636 with specific virtual data values for each of the virtual environment characteristics, a possible virtual environment may be represented. It will be appreciated that a plurality of possible virtual environments are representable by populating instances of the virtual environment data schema with various specific virtual data values for each of the virtual environment characteristics. It will also be appreciated that different possible virtual environments may correspond to different display modes of a holographic object.

The holographic object creation program 608 may generate a holographic object creation graphical user interface (GUI) 642 for display on a display device 644 operatively connected to the computing device 616. The holographic object creation GUI 642 includes a holographic object creation interface 648 that enables a user of the computing device 616, such as a developer, to select a holographic object for development. The holographic object creation interface 648 further enables a developer to select one or more physical object properties of the physical environment data schema 630 and/or virtual environment characteristics of the virtual environment data schema 636 that correspond to a display mode of the holographic object.

In the example shown in FIG. 6, the holographic object creation interface 648 is configured to display a first user-adjustable selector 652 for receiving user input to select a holographic object. The first user-adjustable selector 652 may take the form of individual radio buttons as shown. It will be appreciated a slider element, drop-down menus, or any other suitable input mechanisms may also be used. In this example, a developer selects the wizard 320.

The holographic object creation interface 648 is also configured to display a second user-adjustable selector 656 for receiving user input regarding a physical object property. In this example, the second user-adjustable selector 656 may take the form of a slider element 660. It will be appreciated that individual radio buttons, drop-down menus, or any other suitable input mechanisms may also be used. With reference also to FIG. 4, the physical object property may correspond to physical object property A 632 and may represent a surface hardness of the surface 336 of wall 308.

The second user-adjustable selector 656 is configured to receive user input via slider element 660 indicating a value for the surface hardness of wall 308. In one example, the values of the surface hardness of the wall 308 may range in increasing hardness from H1 representing a soft curtain to H5 representing a concrete surface. As the developer adjusts the slider element 660 between H1 and H5, the surface hardness 634a corresponding to a current position of the slider element 660 is displayed (H3 representing dry wall material in the configuration of FIG. 6).

A third user-adjustable selector 664 is configured to receive user input via individual radio buttons 668a and 668b indicating a value for a virtual environment characteristic. In one example, the virtual environment characteristic may correspond to virtual environment characteristic J 638 and may represent either a public or a private virtual environment in which the selected holographic object, in this example wizard 320, will be displayed.

By using the user-selected combination of one of the possible wall surface hardness values and one of the possible virtual environment characteristics, the holographic object creation program 608 may display a preview interface 672. In this example, the preview interface 672 is configured to display the holographic wizard 320 in a simulated mixed reality environment corresponding to the user-selected combination of a wall surface hardness value and a virtual environment characteristic. As discussed above, the wizard 320 may be displayed in a display mode that corresponds to the user selected wall surface hardness value and virtual environment characteristic. In this manner, a developer may preview the holographic wizard 320 in a variety of different simulated mixed reality environments formed of developer-selected combinations of one of the possible virtual environments and one of the possible destination physical environments.

In another example, the holographic object creation interface 648 may be further configured to enable a developer to classify a holographic object 78 into one or more classes. Each class may contain one or more holographic factors or characteristics that may affect the rendering and/or presentation of the holographic object. For example, where the holographic wizard 320 is classified in a "people" class, the wizard may exhibit certain characteristics relating to motion, strength, interactions with physical and virtual objects, etc. As another example, the holographic asteroid 324 may be classified as a "weapon", and thereby exhibit the ability to interact with physical and virtual objects in the same manner as other objects in the "weapon" class. Advantageously, classifying holographic objects in this manner may improve a developer's efficiency in creating large sets of factors and characteristics for multiple holographic objects.

After displaying the wizard 320 for preview, the holographic object creation program 608 may generate as output the wizard including the display mode. With reference also to FIGS. 1 and 2, the wizard 320 may be configured to be rendered by the holographic object presentation program 14 on the HMD device 38 according to the display mode, such as the first display mode 86, with the destination physical environment 50 viewable through the HMD device.

FIG. 7 illustrates a flow chart of a method 700 for developing a holographic object that self-adapts to a mixed reality environment according to an embodiment of the present disclosure. The following description of method 700 is provided with reference to the software and hardware components of the self-adapting holographic object development system 600 described above and shown in FIG. 6. It will be appreciated that method 700 may also be performed in other contexts using other suitable hardware and software components.

At 704 the method 700 may include determining a physical environment data schema that includes physical object properties and associated value ranges. The physical object properties may be associated with physical objects in a destination physical environment, such that each of a plurality of possible destination physical environments is representable by an instance of the physical environment data schema that is populated with specific physical data values for each of the physical object properties.

At 708 the method 700 may include determining a virtual environment data schema that includes virtual environment characteristics and associated value ranges. Each of a plurality of possible virtual environments is representable by an instance of the virtual environment data schema populated with specific virtual data values for each of the virtual environment characteristics. At 712 the method 700 may include displaying a holographic object creation interface on a display. The holographic object creation interface is configured to display at least one selector for receiving user input corresponding to a display mode of the holographic object, with the display mode based upon one or more of the physical object properties of the physical environment data schema and/or one or more of the virtual environment characteristics of the virtual environment data schema.

At 716 the method 700 may include receiving via the selector user input corresponding to the display mode. At 720 the method may include displaying a preview interface that is configured to display the holographic object having the display mode in different simulated mixed reality environments formed of a user-selected combination of one of the possible virtual environments and one of the possible destination physical environments. At 724 the method 700 may include generating as output the holographic object including the display mode, where the holographic object is configured to be rendered by a holographic object presentation program on an HMD device according to the display mode, with the destination physical environment viewable through the HMD device.

Figure 8:
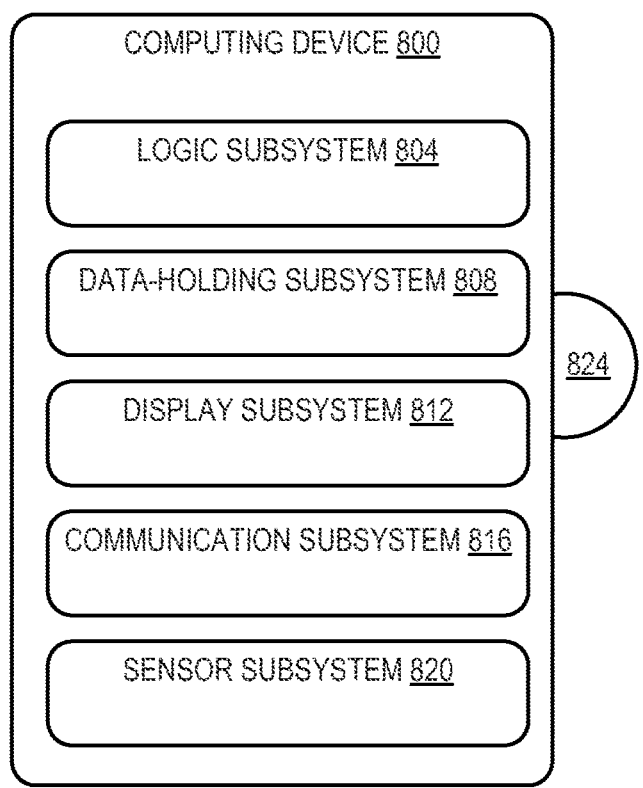
FIG. 8 is a simplified schematic illustration of an embodiment of a computing device.

FIG. 8 schematically shows a nonlimiting embodiment of a computing device 800 that may perform one or more of the above described methods and processes. Computing device 800 is shown in simplified form. It is to be understood that virtually any computer architecture may be used without departing from the scope of this disclosure. In different embodiments, computing device 800 may take the form of a mainframe computer, server computer, desktop computer, laptop computer, tablet computer, home entertainment computer, network computing device, mobile computing device, mobile communication device, gaming device, etc.

As shown in FIG. 8, computing device 800 includes a logic subsystem 804, a data-holding subsystem 808, a display subsystem 812, a communication subsystem 816, and a sensor subsystem 820. Computing device 800 may optionally include other subsystems and components not shown in FIG. 8. Computing device 800 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 804 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 804 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 808 may include one or more physical, non-transitory devices configured to hold data and/or instructions executable by the logic subsystem 804 to implement the herein described methods and processes. When such methods and processes are implemented, the state of data-holding subsystem 808 may be transformed (e.g., to hold different data).

Data-holding subsystem 808 may include removable media and/or built-in devices. Data-holding subsystem 808 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 808 may include devices with one or more of the following characteristics: volatile, nonvolatile, dynamic, static, read/write, read-only, random access, sequential access, location addressable, file addressable, and content addressable. In some embodiments, logic subsystem 804 and data-holding subsystem 808 may be integrated into one or more common devices, such as an application specific integrated circuit or a system on a chip.

FIG. 8 also shows an aspect of the data-holding subsystem 808 in the form of removable computer-readable storage media 824, which may be used to store and/or transfer data and/or instructions executable to implement the methods and processes described herein. Removable computer-readable storage media 824 may take the form of CDs, DVDs, HD-DVDs, Blu-Ray Discs, EEPROMs, and/or floppy disks, among others.

It is to be appreciated that data-holding subsystem 808 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 812 may be used to present a visual representation of data held by data-holding subsystem 808. Display subsystem 812 may include, for example, the transparent display 58 of the HMD device 38. As the above described methods and processes change the data held by the data-holding subsystem 808, and thus transform the state of the data-holding subsystem, the state of the display subsystem 812 may likewise be transformed to visually represent changes in the underlying data. The display subsystem 812 may include one or more display devices utilizing virtually any type of technology. Such display devices may be combined with logic subsystem 804 and/or data-holding subsystem 808 in a shared enclosure, or such display devices may be peripheral display devices.

Communication subsystem 816 may be configured to communicatively couple computing device 800 with one or more networks, such as network 42, and/or one or more other computing devices. Communication subsystem 816 may include wired and/or wireless communication devices compatible with one or more different communication protocols. As nonlimiting examples, the communication subsystem 816 may be configured for communication via a wireless telephone network, a wireless local area network, a wired local area network, a wireless wide area network, a wired wide area network, etc. In some embodiments, the communication subsystem may allow computing device 800 to send and/or receive messages to and/or from other devices via a network such as the Internet.

Sensor subsystem 820 may include one or more sensors configured to sense different physical phenomenon (e.g., visible light, infrared light, sound, acceleration, orientation, position, temperature, etc.) as described above. For example, the sensor subsystem 820 may comprise one or more eye-tracking sensors, image sensors, microphones, motion sensors such as accelerometers, thermometers, touch pads, touch screens, and/or any other suitable sensors. Sensor subsystem 820 may be configured to provide observation information to logic subsystem 804, for example. As described above, observation information such as eye-tracking information, image information, audio information, ambient lighting information, depth information, position information, motion information, and/or any other suitable sensor data may be used to perform the methods and processes described above.

The term "program" may be used to describe an aspect of the self-adapting holographic object presentation system 10 and/or self-adapting holographic object development system 600 that is implemented to perform one or more particular functions. In some cases, such a program may be instantiated via logic subsystem 804 executing instructions held by data-holding subsystem 808. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A self-adapting holographic object presentation system for presenting a holographic object that self-adapts to a mixed reality environment including a destination physical environment and a virtual environment, the self-adapting holographic object presentation system comprising:

a display device including an associated processor and memory;

a holographic object presentation program executed by the processor using portions of the memory, the holographic object presentation program configured to:

capture physical environment data from the destination physical environment using one or more sensors;

create a model of the destination physical environment based on the captured physical environment data, the model including identified physical objects in the destination physical environment having associated physical object properties;

identify a holographic object for display on the display device, wherein the holographic object includes one or more rules linking a detected environmental condition and/or the physical object properties of the identified physical objects with a display mode of the holographic object, wherein the display mode comprises a first user interaction mode that is based on a first display resolution of the holographic object that is above a threshold resolution and a second user interaction mode that is based on a second display resolution of the holographic object that is below the threshold resolution;

apply the one or more rules to select the display mode of the holographic object based on the detected environmental condition and/or the physical object properties of the identified physical objects in the destination physical environment; and display the holographic object on the display device according to the display mode.

2. The self-adapting holographic object presentation system of claim 1, wherein the one or more rules are contained within a data schema for the holographic object.

3. The self-adapting holographic object presentation system of claim 1, wherein the sensors are selected from the group consisting of eye-tracking sensors, optical sensors, and positions sensors, and wherein creating the model of the destination physical environment includes a surface reconstruction phase in which surfaces are identified and reconstructed, and an object identification phase in which the identified surfaces are grouped into the identified physical objects, with the physical object properties of the identified physical objects being either prestored or identified through the physical environment data.

4. The self-adapting holographic object presentation system of claim 1, wherein the display mode of the holographic object includes a scale factor that indicates a scale at which the holographic object will be rendered relative to the destination physical environment.

5. The self-adapting holographic object presentation system of claim 1, wherein the display mode of the holographic object includes an auto-fit factor that indicates that the holographic object will be automatically sized to fit into the destination physical environment.

6. The self-adapting holographic object presentation system of claim 1, wherein the display mode includes a user interaction factor that indicates the user interaction mode for the holographic object.

7. The self-adapting holographic object presentation system of claim 1, wherein the holographic object presentation system is configured to download the holographic object from a library of holographic objects via a computer network.

8. A method for presenting a holographic object that self-adapts to a mixed reality environment including a destination physical environment and a virtual environment, comprising:

capturing physical environment data from the destination physical environment using one or more sensors of a display device;

creating a model of the destination physical environment based on the captured physical environment data, the model including identified physical objects in the destination physical environment having associated physical object properties;

identifying a holographic object for display on the display device, wherein the holographic object includes one or more rules linking a detected environmental condition and/or physical object properties of the identified physical objects with a display mode of the holographic object, wherein the display mode comprises a first user interaction mode that is based on a first display resolution of the holographic object that is above a threshold resolution and a second user interaction mode that is based on a second display resolution of the holographic object that is below the threshold resolution;

applying the one or more rules to select the display mode of the holographic object based on the detected environmental condition and/or the physical object properties of the identified physical objects in the destination physical environment; and displaying the holographic object on a display of the display device according to the display mode.

9. The method of claim 8, wherein the one or more rules are contained within a rules data schema for the holographic object.

10. The method of claim 8, wherein the sensors are selected from the group consisting of eye-tracking sensors, optical sensors, and positions sensors, and wherein creating the model of the destination physical environment further includes:

identifying and reconstructing surfaces in a surface reconstruction phase, and grouping the identified surfaces into the identified physical objects in an object identification phase, with the physical object properties of the identified physical objects being either prestored or identified through the physical environment data.

11. The method of claim 8, wherein the rules are developer-specified or user-specified.

12. The method of claim 8, wherein the display mode of the holographic object includes a scale factor that indicates a scale at which the holographic object will be rendered relative to the destination physical environment.

13. The method of claim 8, wherein the display mode of the holographic object includes an auto-fit factor that indicates that the holographic object will be automatically sized to fit into the destination physical environment.

14. The method of claim 8, wherein the display mode includes a user interaction factor that indicates the user interaction mode for the holographic object.

15. A method for developing a holographic object that self-adapts to a mixed reality environment including a virtual environment and a destination physical environment with physical objects having associated physical object properties, comprising:

determining a physical environment data schema that includes the physical object properties and associated value ranges, where each of a plurality of possible destination physical environments is representable by an instance of the physical environment data schema populated with specific physical data values for each of the physical object properties;

determining a virtual environment data schema that includes virtual environment characteristics and associated value ranges, where each of a plurality of possible virtual environments is representable by an instance of the virtual environment data schema populated with specific virtual data values for each of the virtual environment characteristics;

displaying a holographic object creation interface on a display, the holographic object creation interface being configured to display at least one selector for receiving user input corresponding to a display mode of the holographic object that is based upon one or more of the physical object properties of the physical environment data schema and/or one or more of the virtual environment characteristics of the virtual environment data schema, wherein the display mode comprises a first user interaction mode that is based on a first display resolution of the holographic object that is above a threshold resolution and a second user interaction mode that is based on a second display resolution of the holographic object that is below the threshold resolution;

receiving via the selector user input corresponding to the display mode; and generating as output the holographic object including the display mode, wherein the holographic object is configured to be rendered by a holographic object presentation program on a head-mounted display device according to the display mode when the one or more of the physical object properties of the physical environment data schema and/or the one or more of the virtual environment characteristics of the virtual environment data schema are present in the mixed reality environment, with the destination physical environment viewable through the head-mounted display device.

16. The method of claim 15, further comprising displaying a preview interface configured to display the holographic object having the display mode in different simulated mixed reality environments which are formed of a user-selected combination of one of the possible virtual environments and one of the possible destination physical environments.

* * * * *